United States Patent Office.

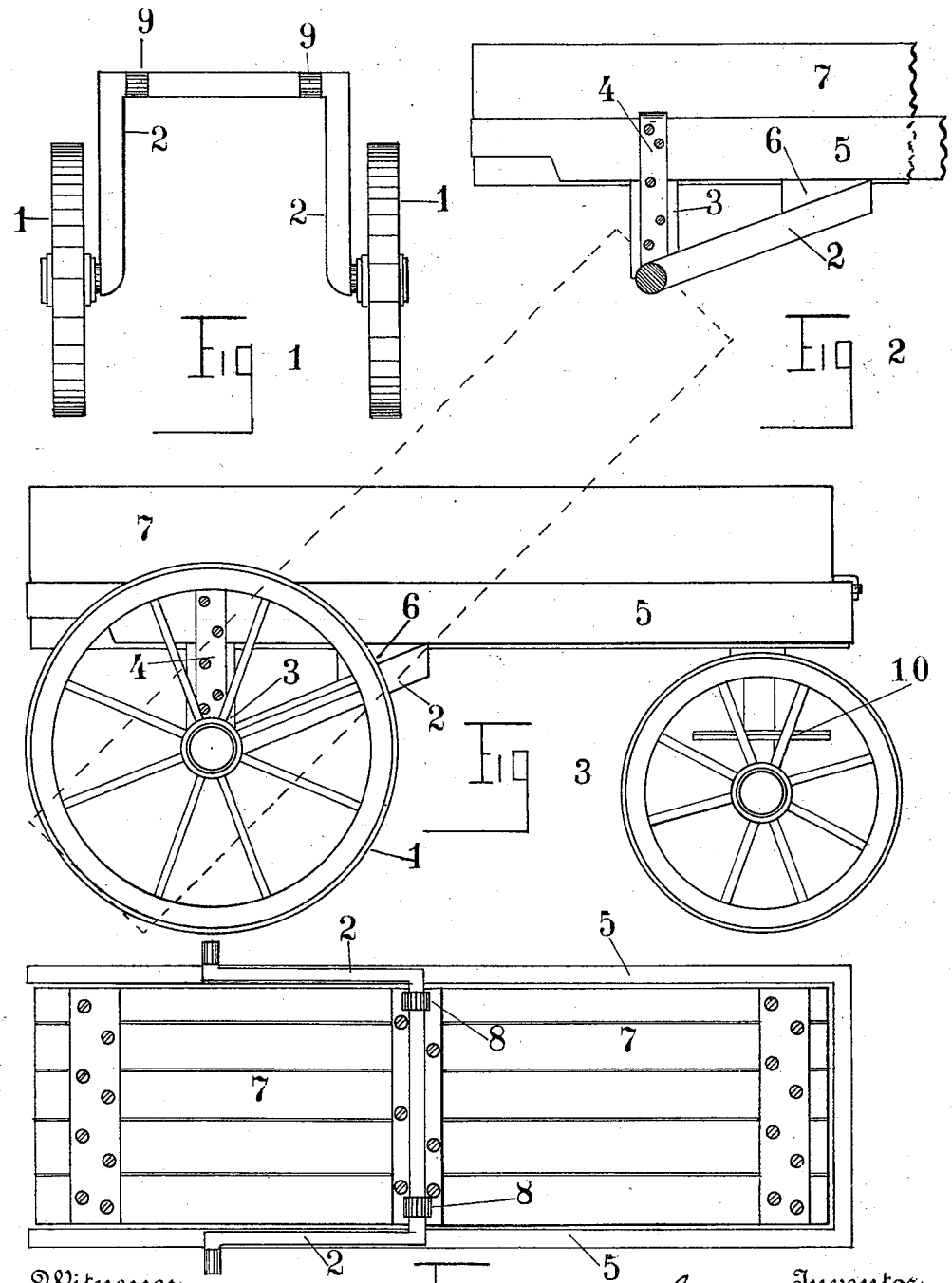

GEORGE KAUTZ, OF ALBANY, NEW YORK.

DUMPING-WAGON.

SPECIFICATION forming part of Letters Patent No. 601,659, dated April 5, 1898.

Application filed November 8, 1897. Serial No. 657,788. (No model.)

*To all whom it may concern:*

Be it known that I, GEORGE KAUTZ, a citizen of the United States, residing at Albany, New York, have invented certain new and useful Improvements in Dumping-Wagons; and I do hereby declare the following to be a full, clear, and exact description of the invention, such as will enable others skilled in the art to which it appertains to make and use the same, reference being had to the accompanying drawings, and to the figures of reference marked thereon, which form a part of this specification.

The object of my invention is to provide a new and improved dumping-wagon.

In the drawings, Figure 1 shows a rear elevation of the rear wheels of my wagon having a crank-axle; Fig. 2, a partial side elevation of my wagon-box, frame, and axle with the wheel removed; Fig. 3, a side elevation of my wagon in operative construction; Fig. 4, the bottom of my wagon-box, frame, and rear axle shown in plan.

The numeral 1 shows the rear wheels of my wagon operatively set upon the crank-axle 2 2. This axle is preferably constructed of a continuous rigid piece of metal formed into practically the shape shown in Fig. 1 and has portions of the cross-head rounded, as seen at 9 9, so that the eyebolts 8 8 may turn easily thereon when the wagon-box 7 is hung on the axle thereby. The main frame 5 consists, preferably, of timbers, between which my wagon-box 7 rests and tips longitudinally. The frame 5 is connected to the rear axle 2 2 at but two points preferably—*i. e.*, by an upright piece 3, the lower end of which rests on the axle and is held thereto by stay-irons 4 4, fastened to the pieces 3 3 and the frame 5. The crank-axle is turned up and under the wagon-box, so that the cross-head thereof extends forward toward the front of the wagon and rests against the frame 5 and a block 6, the block and axle being made fast to the frame 5, thus causing the crank-axle to lie in a slanting position—*i. e.*, the forward or cross-head end of the axle lies against the frame 5, and from this point slants rearward to the wheel-hub and therefore touches the frame 5 at its forward end only, the pieces 3 3 being separate bodies from the frame. The object of this mode of construction is to prevent too much stiffness in the frame and running-gear of the wagon, and this is accomplished from the fact that the crank-axle being attached to the frame only at its forward end and by means of the blocks 6 6, which are small comparatively and bring but a slight surface in contact with the frame, any racking strains brought upon the wagon will cause them to give slightly. This giving or moving of the axle and blocks 6 6 prevents an undue rigidity at this point. The upright pieces 3 3, being simply fastened in place by the stay-irons 4 4, also will give at their points of contact with the frame and axle on account of the slight flexibility of said stay-irons, and too great rigidity at this point is prevented. When so constructed, my wagon, while firm enough for every purpose, is also flexible enough to avoid that undesirable rigidity that would ensue if the crank-axle 2 2 was laid against the frame throughout its entire length, or practically so, for in that case it has been found empirically that the rigidity is so great that when the loaded wagon passes over uneven ground one or the other of the rear wheels will be raised above the ground or fail to touch the ground, leaving the load to be carried on the frame alone, thus causing an undue strain to be placed on the frame.

I am aware that crank-axles have been used with dumping-wagons heretofore; but the connection between the wagon-box and frame has been entirely different than shown herein and has been faulty in producing a wagon of such rigidity as to be practically useless; and I do not claim as to such wagons, but disclaim as to all such; but, Having described my invention, what I claim is—

1. A dumping-wagon having a rear crank-axle projecting forward of the rear wheels and under the wagon, the forward end of the crank-axle being attached to the wagon; the arms of the axle sloping downward and rearward and out of contact with the wagon and having stay-pieces between the axle and the wagon substantially as described.

2. A dumping-wagon having a rear crank-axle projecting forward of the rear wheels and under the wagon, the forward end of the crank-axle being movably attached to the wagon; the arms of axle sloping downward and out of contact with the wagon and upright pieces attached to the axle and to the wagon substantially as described.

3. A dumping-wagon having a rear crank-axle projecting forward of the rear wheels and under the wagon the crank-axle having a cross bar or head extending across the wagon-bottom and means for pivoting the wagon-box to the crank-axle cross head or bar, the arms of the axle sloping downward and rearward and out of contact with the wagon and stay-pieces attached to the axle and to the wagon substantially as described.

In testimony whereof I affix my signature in presence of two witnesses.

GEORGE KAUTZ.

Witnesses:
J. F. HARRIS,
JAMES M. BROWN.